E. C. BARTON.

Chime-Toy.

No. 6,644. Reissued Sept. 14, 1875.

Witnesses:
A. C. Livingston
L. T. Emery

Inventor:
Elijah C. Barton
(Assignor to Song Bell Manufacturing Co.)
by M. M. Livingston
Atty.

N. PETERS, PHOTO-LITHOGRAPHER, WASHINGTON, D. C.

BEST AVAILABLE COPY

UNITED STATES PATENT OFFICE.

LIJAH C. BARTON, OF EAST HAMPTON, CONNECTICUT, ASSIGNOR TO THE GONG-BELL MANUFACTURING COMPANY, OF SAME PLACE.

IMPROVEMENT IN CHIME-TOYS.

Specification forming part of Letters Patent No. 150,933, dated May 19, 1874; reisue No. 6,644, dated September 14, 1875; application filed August 14, 1875.

*o all whom it may concern:*

Be it known that I, ELIJAH C. BARTON, of ast Hampton, in the county of Middlesex nd State of Connecticut, have invented a ew and Improved Chime-Toy; and I hereby eclare that the following is a full, clear, and xact description of the same, reference being ad to the accompanying drawing, which rms a part of this specification.

Heretofore, various kinds of well-known ys have had bells attached to them in different ways, so as to ring by being vibrated struck—as, for example, the toy hoop, ith bells attached, patented to Crawford and ervey, November 19, 1867.

The object of the present invention is to roduce a new tractable toy for the amusement of children—one which may be properly lled a bell-toy or toy bell.

This invention consists in the combination, ith a pair of connected wheels, of one or ore bells, arranged between said wheels, so s to revolve therewith, and be caused to ring sound whenever said wheels are rotated as the act of being drawn or pushed along the oor. It also consists in the combination, ith such connected wheels and bell or bells, f a tongue or draft bar, so connected thereto s to allow said wheels and bell or bells to otate independently of it.

Figure 1:
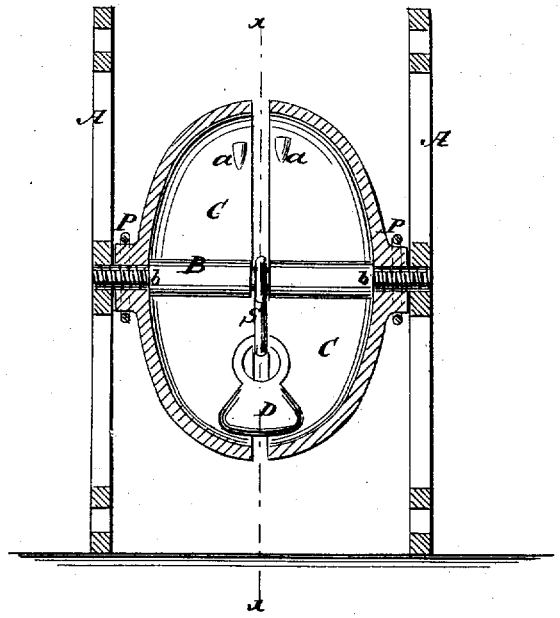
Figure 2:
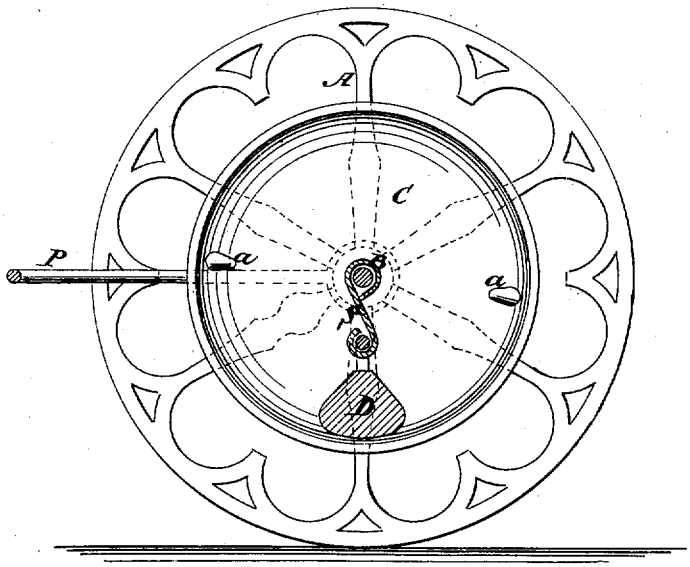

In the accompanying drawing, Figure 1 is vertical axial section of my improved toy, nd Fig. 2 is a central vertical section taken n the plane of the line *x x*, Fig. 1.

A A designate a pair of wheels, which are ecured upon opposite ends of an axle, B, in ny suitable manner—say, by being screwed pon the axle, as shown in Fig. 1. C C re two open-mouthed or gong-shaped bells, hich are secured to the said axle B in any uitable manner, with their mouths facing ach other, but with sufficient space between constitute a throat to permit the escape of ound. They are shown as mounted upon the xle B in such manner as to abut against a oulder, *b*, formed upon the axle, the wheels A being screwed upon the axle after the ells have been applied thereto, the ends of e axle being battered over to keep the heels and bells from rotating independently f the axle.

It is, however, obvious that the axle may be provided with squared ends, which may pass through square holes in the bells and wheels, and the ends of the axle be battered over as before. This will obviate the cutting of screw-threads.

D is the clapper of the bell, which is loosely suspended from the axle B. I have shown it as depending from the lower end of a chain or link, *s*, the other end of said chain or link encircling a groove formed in the said axle B. The bells C C are provided with teats or projections *a a*, so arranged that when the bells are revolved the said teats will be brought in contact with the clapper D, and the bells caused to sound. P designates a tongue, by which to draw the toy along the floor. In the example shown, this tongue is merely a loop of wire, having its ends bent loosely around the hubs of the bells, so that the wheels and bells may revolve independently of such tongue or draft-bar.

I will here remark that it is obvious that the axle B may be made sufficiently long to receive upon it several pairs of bells of different tones; or, indeed, instead of a central axle, B, the wheels may be connected nearer their peripheries by two or more rods or bars, and upon such rods suitable-sized open-mouthed or gong bells may be arranged in the same manner as shown with the respect to the axle B.

What I claim as my invention, and desire to secure by Letters Patent, is—

1. The combination, with the connected wheels A A, of one or more bells, arranged between, and connected to, said wheels, so as to revolve simultaneously therewith, and to ring when so revolving.

2. The combination of the loosely-connected tongue or draft-bar P with the wheels A A, and intermediately arranged revolving bell or bells.

3. The combination of the following elements: the wheels A A, a pair of open-mouthed or gong-shaped bells, C C, provided with striking mechanism, and an axle or cross rod, B, connecting the said wheels.

ELIJAH C. BARTON.

Witnesses:

GEORGE H. WHITE,

RODERICK DAY.